March 5, 1957  W. P. SINDELAR  2,783,700
UNIVERSALLY ADJUSTABLE DISK MOUNTING
Filed July 19, 1954  2 Sheets-Sheet 1
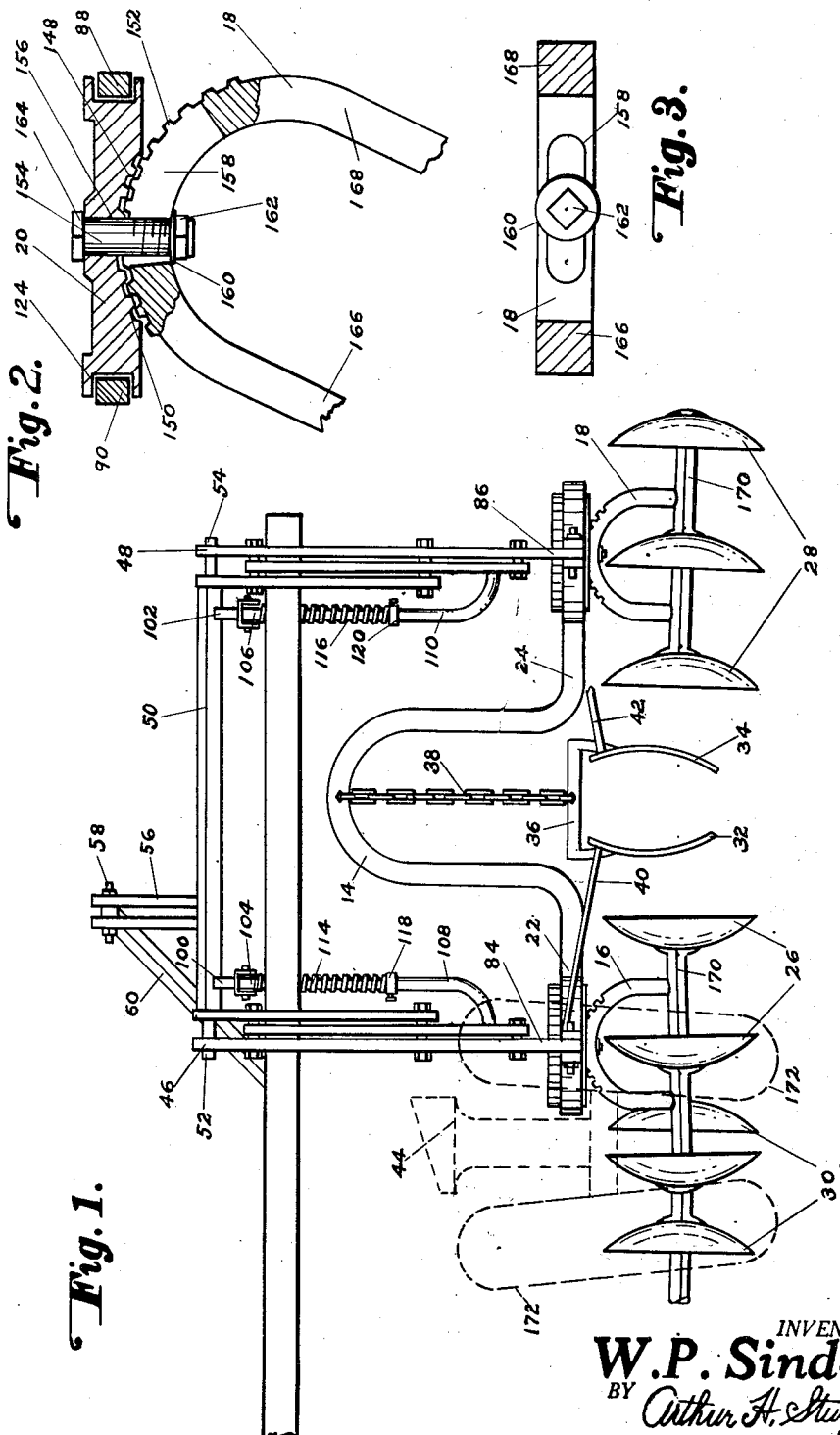
INVENTOR.
W. P. Sindelar
BY Arthur H. Sturges.
Attorney

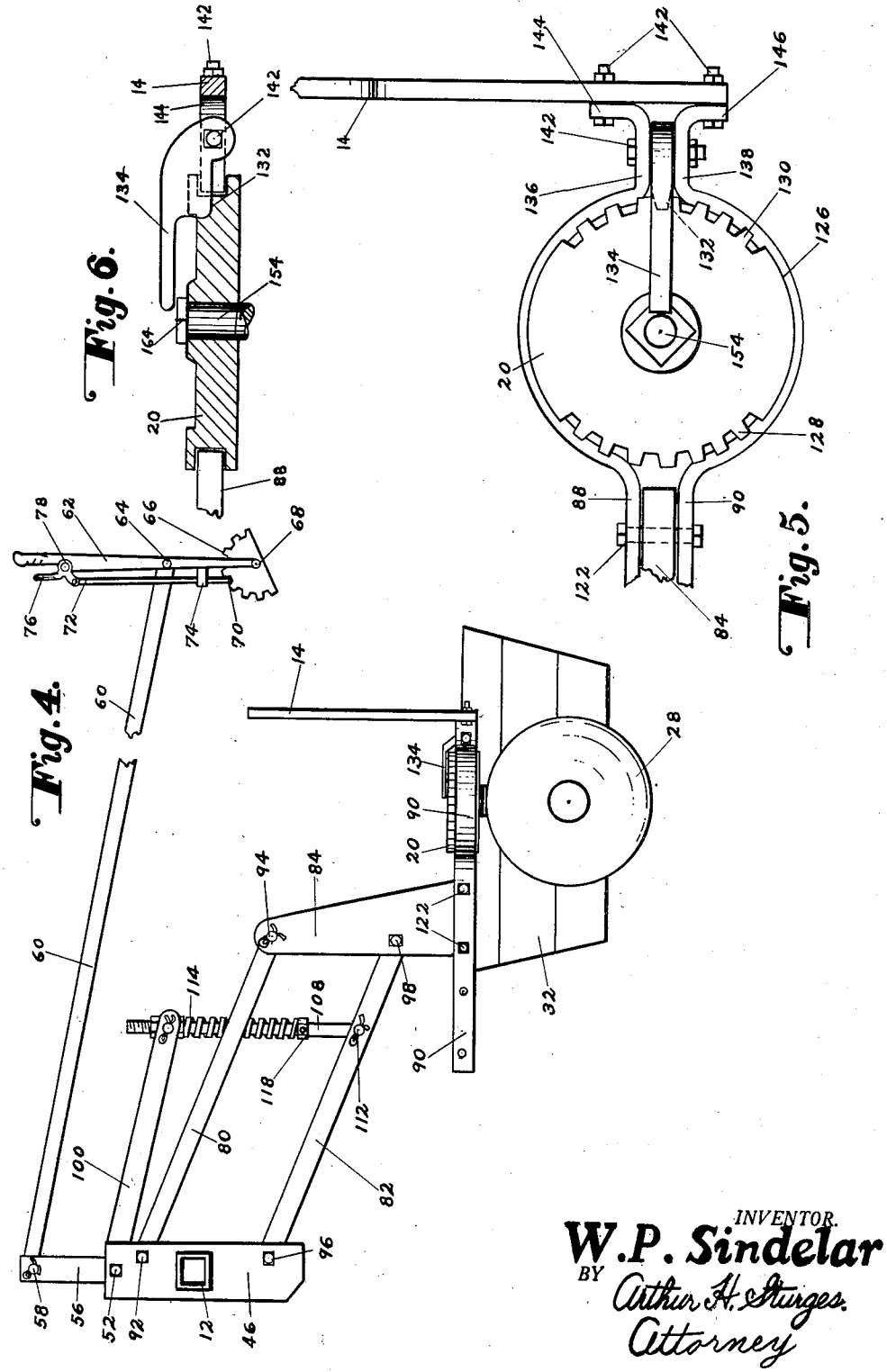

United States Patent Office 2,783,700
Patented Mar. 5, 1957

2,783,700

UNIVERSALLY ADJUSTABLE DISK MOUNTING

William P. Sindelar, Cedar Rapids, Nebr., assignor of one-fourth to Victor L. Gross, Omaha, Nebr.

Application July 19, 1954, Serial No. 444,016

3 Claims. (Cl. 97—47.34)

This invention relates to agricultural implements and particularly disc harrows and cultivators, such as Lister cultivators, and in particular laterally spaced groups of discs positioned under the forward end of a tractor and in full view of an operator thereof whereby the discs produce a steadying action providing greater stability in cultivating slopes and sides of hills, and wherein with one group of discs on one side of a row of plants and another on the opposite side the discs of the groups are adapted to be set to, selectively, draw soil in around the plants, or carry the soil away from the plants, and where the cultivator is used for working small plants shields are suspended at the sides of a row to prevent covering the plants with soil.

The purpose of this invention is to provide a disc cultivator attachment for a tractor wherein the weight of the tractor holds the discs in the soil, making it possible to control the depth the discs penetrate into the soil, and wherein the discs, which are mounted in groups, are adapted to be tilted from side to side, turned to any angle desired with respect to the forward travel of the tractor, and completely reversed to provide a suction type cultivator, whereby the discs may pile soil around the plants or work the soil away from the plants.

Conventional disc harrows and attachments are drawn behind tractors and the like and when working young corn and other small plants it is difficult to work close to the plants without scooping out parts of rows. For this reason disc cultivators are very seldom used on small plants and it is difficult to work soil toward plants with tooth harrows. With this thought in mind this invention contemplates a disc harrow mounted under the forward part of a tractor in which the discs are provided in groups, preferably with three in each group and in which the positions of the discs are adjustable in substantially all directions.

The object of this invention is, therefore, to provide means for constructing a disc cultivator wherein oppositely disposed groups of discs are adjustably mounted under the forward end of a tractor wherein the discs are in full view of the operator of the tractor.

Another object of the invention is to provide means for mounting groups of discs on a tractor whereby the discs are adapted to be tilted laterally.

Another important object of the invention is to provide means for mounting groups of discs on a tractor wherein the discs are adapted to be positioned with the arcuate surfaces extended forwardly wherein cavitation is produced in the concave trailing areas providing a suction type cultivator.

It is yet another object of the invention to provide means for attaching groups of discs to a tractor whereby it is possible to cultivate relatively high corn.

A further object of the invention is to provide a disc cultivator having groups of discs in combination with shields wherein the discs are adapted to be set to work soil up around plants with the shields preventing the plants being covered, in which the discs are controlled from a seat on a tractor to which the groups of discs are attached.

A still further object of the invention is to provide a disc cultivator attachment adapted to be mounted on the forward part of a tractor in which the discs are positioned and operated in groups, and in which the attachment is of a simple and economical construction.

With these and other objects and advantages in view, the invention embodies a yoke formed with an inverted U-shaped frame having outwardly extended ends with means for adjustably mounting discs in groups on said extended ends whereby the discs are adapted to be tilted in vertical planes and adjusted in horizontal planes to different angles with respect to the direction of travel, and with means for adjustably mounting yokes carrying groups of discs on the forward portion of a tractor with the discs in full view of an operator of the tractor.

Other features and advantages of the invention will appear from the following description taken in connection with the drawings, wherein:

Figure 1 is a front elevational view showing the portion of the attachment on one side of the tractor, the front wheels and part of the tractor being shown in dotted lines.

Figure 2 is a detail showing the upper part of one of the disc tilting yokes, the parts being shown on an enlarged scale and parts being broken away and shown in section.

Figure 3 is a cross section looking upwardly showing the under surface of the intermediate part of the yoke shown in Figure 2.

Figure 4 is a side elevational view illustrating the elements for attaching the device to a tractor.

Figure 5 is a plan view looking downwardly upon the upper surface of the unit shown in Figure 2, and showing one of the clamps for holding the yokes by which the discs are tilted.

Figure 6 is a longitudinal section through one of the horizontally disposed discs, as shown in Figure 5, with parts of the horizontally disposed bars in which the discs are mounted broken away, and showing the latching means for preventing rotation of the discs.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a support bar or beam adapted to be mounted on the forward end of a tractor, numeral 14 a support yoke suspended by the bar 12 and positioned on one side of the attachment, numerals 16 and 18 tilting yokes adjustably mounted on ratchet wheels 20 carried by extended ends 22 and 24 of the yoke 14, numeral 26 discs carried by the yoke 16, numeral 28 discs carried by the yoke 18, numeral 30, discs of a group for working the ground over which the tractor travels and positioned to overlap the discs 26 and also discs of a group similar to the discs 30 and extended from a unit on the opposite side of the tractor, and numerals 32 and 34 shields connected by a bar 36 suspended from the yoke 14 by a chain 38 and held laterally by braces 40 and 42.

The support or mounting bar 12 extends from both sides of a tractor, as indicated by the numeral 44, and a unit, such as the unit illustrated in Figure 1, is carried by each end. The groups of discs, such as the discs 26 and 28, are mounted to straddle a row of plants on each side of the tractor.

Each end of the beam 12 is provided with spaced pairs of plates 46 and 48 which extend above and below the beam, and a shaft 50 which is rotatably mounted in the upper ends of the plates with pins 52 and 54 is provided with spaced arms 56 the upper ends of which are connected by a pin 58 to a rod 60 which extends rearwardly to a hand crank 62 on the tractor. The rod is connected to the crank with a pin 64 and the crank is pivotally mounted in a segment 66 with a pin 68. The crank 62 is retained in adjusted positions on the segment 66 by a pawl 70 on a rod 72 extended through a bearing 74 and actuated by a hand lever 76 connected to the rod 72 and pivotally mounted by a pin 79 on the upper end of the crank.

Spaced pairs of parallel bars 80 and 82 extend from the plates 46 and 48 to standards 84 and 86 extended upwardly from pairs of bars 88 and 90 which are provided with confronting concave arcuate sections providing circular sockets in which the ratchet wheels 20 are clamped, as shown in Figure 5. The upper bars 80 are pivotally connected to the plates with pins 92 and to the standards with pins 94, and the lower bars 82 are pivotally connected to the plates with pins 96 and to the standards with pins 98. The shaft 50 is also provided with lift arms 100 and 102 which are secured to the shaft, such as by welding, and the extended ends of the arms are provided with bearings 104 and 106, respectively, through which the upper ends of rods 108 and 110 extend. Arcuate lower ends of the rods are pivotally connected to the lower bars 82 with pins 112, and the upper parts of the bars are provided with springs 114 and 116, the upper ends of which bear against the bearings 104 and 106, and the lower ends of which are held by set collars 118 and 120.

With this arrangement of parallel bars, lift arms, springs, cranks and levers the elevation of the discs in relation to the soil is readily adjustable from the seat of a tractor upon which the cultivator is mounted.

Although the discs are illustrated as having three discs in each group, it will be understood that a group may contain as many discs as may be desired.

The standards 84 and 86 are secured in the bars 88 and 90 with bolts 122 and, as shown in Figure 5, the bars 88 and 90 extend around the ratchet wheels 20 with the opposite ends of the bars secured to the extended ends 22 and 24 of the support yoke 14. In Figure 5 one ratchet wheel 20 is shown and it will be understood that a similar ratchet wheel is provided on the opposite end of the yoke. The ratchet wheels 20 are provided with annular grooves 124 in which the confronting arcuate portions of the bars are positioned and the upper flanges 126 of the ratchet wheels are notched to form teeth 128 and 130 which are positioned to coact with a tooth 132 extended from a locking arm 134 that is secured between ends 136 and 138 of the bars 88 and 90 with bolts 140 and that extends over the ratchet wheels 20. The ends 136 and 138 are secured to the extended ends of the support yoke with bolts 142 which extend through flanges 144 and 146 extended from the ends 136 and 138.

The under surfaces of the ratchet wheels 20 are provided with arcuate recesses 148 and teeth 150 in the recesses are positioned to coact with teeth 152 on end surfaces of the tilting yokes 16 and 18 in which the discs are carried. The yokes 16 and 18 are secured to the ratchet wheels 20 with studs 154 that are positioned in openings 156 in the discs and that extend through slots 158 in the yokes. Washers 160 and nuts 162 are positioned on the lower ends of the studs and nuts 164 are threaded on the upper ends.

The lower ends of arms 166 and 168 of the tilting yokes 16 and 18 are secured to shafts 170 on which the discs 26, 28, and 30 are mounted, such as by welding, and the discs are mounted on the shafts by conventional means.

With the attachment mounted on a tractor and with the shields 32 and 34 spaced from the wheels 172 whereby with the wheels traveling between rows of corn the shields will follow one row, the soil may be worked on both sides of the row at the same time, and the discs may be set to pull soil in around the plants or push the soil away from the plants, as may be desired. The penetration of the discs into the soil is also controlled by the hand crank 62 on the tractor, and with the beam 12 mounted on the tractor the weight of the tractor holds the discs in the soil so that the use of bricks and other weights for retaining the discs in the soil is obviated.

From the foregoing specification, it will become apparent that the invention disclosed will adequately accomplish the functions for which it has been designed, and in an economical manner, and that its simplicity, accuracy, and ease of operation are such as to provide a relatively inexpensive device, considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts such as come within the purview of the invention claimed may be resorted to, in actual practice, if desired.

Having now described the invention that which is claimed to be new and desired to be procured by Letters Patent, is:

1. In a disc cultivator attachment, the combination which comprises a transversely positioned horizontally disposed mounting bar, spaced pairs of horizontally disposed longitudinally positioned bars with confronting concave arcuate sections providing circular sockets therein spaced from the mounting bar, spaced pairs of parallel bars connecting the bars with the circular sockets therein to the mounting bar, means for actuating the parallel bars to adjust the elevation of the bars with the circular sockets therein in relation to the mounting bar, ratchet wheels having arcuate recesses with teeth therein in under surfaces thereof rotatably mounted in the circular sockets, means for clamping the ratchet wheels in the circular sockets, disc carrying yokes with teeth in arcuate surfaces thereof and also with elongated slots in the said arcuate surfaces secured by bolts extended through the slots to said ratchet wheels with the teeth of the yokes meshing with the teeth in the arcuate recesses of said ratchet wheels, discs carried by the disc carrying yokes, and yokes connecting extended ends of the pairs of bars with the circular sockets therein.

2. In a disc cultivator attachment, the combination which comprises a transversely positioned horizontally disposed mounting bar, spaced pairs of horizontally disposed longitudinally positioned bars with confronting concave arcuate sections providing circular sockets therein spaced from the mounting bar, spaced pairs of parallel bars connecting the bars with the circular sockets therein to the mounting bar, arms pivotally mounted on the mounting bar and adjustably connected to the lowermost of the parallel bars, a hand lever operatively connected to the arms for actuating the parallel bars to adjust the elevation of the bars with the circular stockets therein in relation to the mounting bar, ratchet wheels having arcuate recesses with teeth therein in under surfaces thereof rotatably mounted in the circular sockets, a locking arm having a tooth thereon pivotally mounted in the bars having the circular sockets therein and positioned whereby the tooth is in engagement with teeth of the ratchet wheel for retaining discs of the cultivator in angular positions in relation to the mounting bar, means for clamping the ratchet wheels in the circular sockets, disc carrying yokes with teeth in arcuate surfaces thereof and also with elongated slots in said arcuate surfaces secured by bolts extended through the slots to the ratchet wheels with the teeth of the yokes meshing with the teeth of the ratchet wheels, discs carried by the disc carrying yokes, and support yokes connecting extended ends of the pairs of the bars with the circular sockets therein.

3. In a cultivator attachment, the combination which comprises a transversely positioned horizontally disposed mounting bar, spaced pairs of horizontally disposed longitudinally positioned bars with confronting concave arcuate sections providing circular sockets therein spaced from the mounting bar, uprights mounted on the pairs of bars, spaced vertically disposed plates carried by the mounting bar, parallel bars connecting the standards to the plates of the mounting bar, a hand lever, means operatively connecting the hand lever to the parallel bars for adjusting the elevation of the pairs of bars, ratchet wheels having arcuate recesses with teeth therein in under surfaces thereof rotatably mounted in the circular sockets, latch means for retaining the ratchet wheels in adjusted positions in the circular sockets, disc carrying yokes having teeth on arcuate surfaces thereof adjustably secured to the ratchet wheels with the teeth thereof meshing with the teeth of the ratchet wheels for retaining discs carried thereby in adjusted angular positions, support yokes secured to extended ends of the pairs of bars, and spaced opposed shields suspended from the support yokes and positioned to straddle rows of plants positioned on the sides of a tractor upon which the mounting bar is positioned.

References Cited in the file of this patent

UNITED STATES PATENTS

| | | |
|---|---|---|
| 1,832,021 | Hand | Nov. 17, 1931 |
| 1,906,430 | Strehlow | May 2, 1933 |
| 1,992,428 | Houston | Feb. 26, 1935 |
| 2,071,118 | Graham | Feb. 16, 1937 |
| 2,111,453 | Lange | Mar. 15, 1938 |
| 2,505,280 | Ellinghuysen | Apr. 25, 1950 |